Feb. 7, 1928. 1,658,678
W. B. HEINIGER
AUTOMATIC PRESSURE RETAINING AND SUSTAINING VALVE FOR AIR BRAKE SYSTEMS
Filed May 3, 1927 2 Sheets-Sheet 1
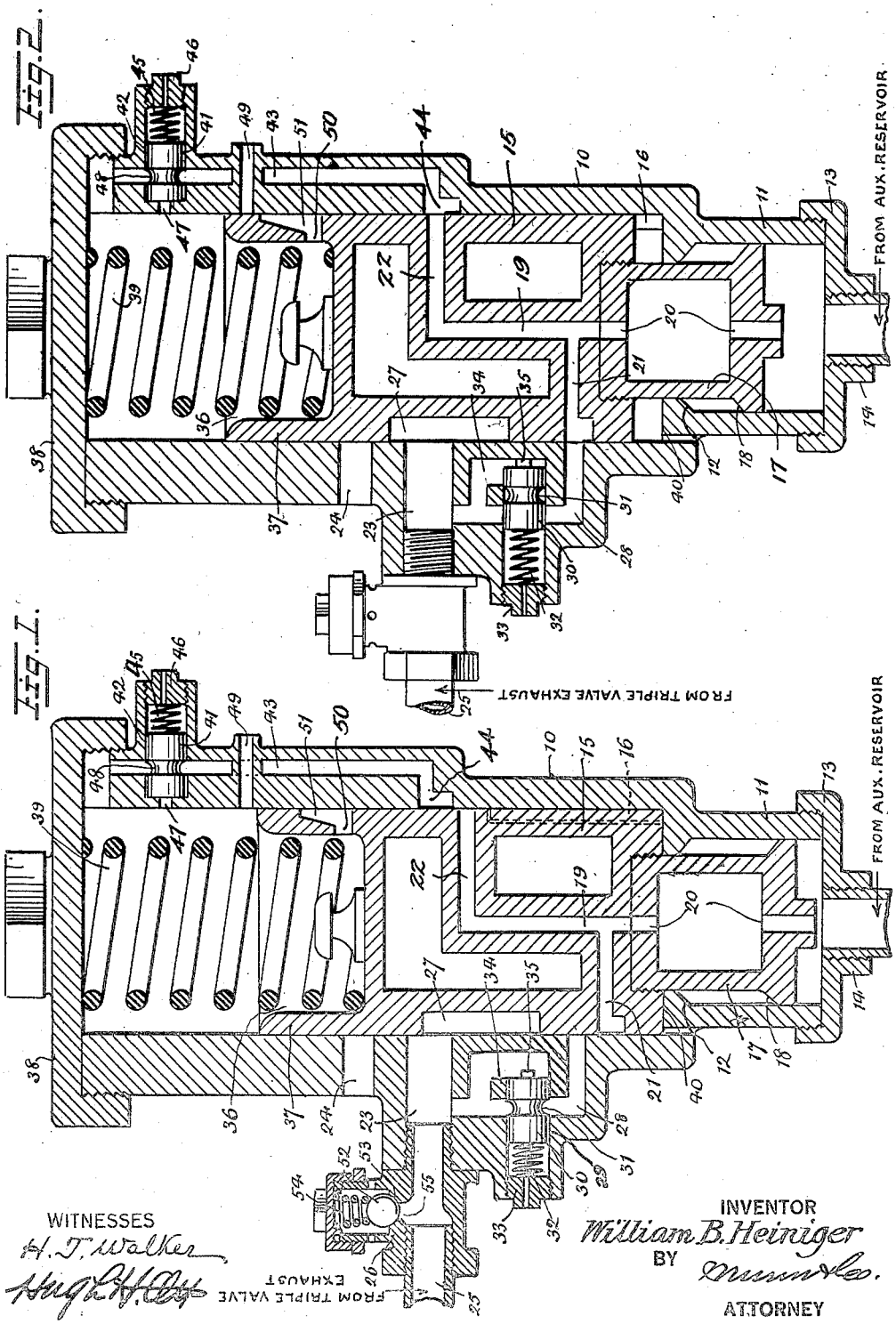
INVENTOR
William B. Heiniger
BY
ATTORNEY
WITNESSES
H. T. Walker

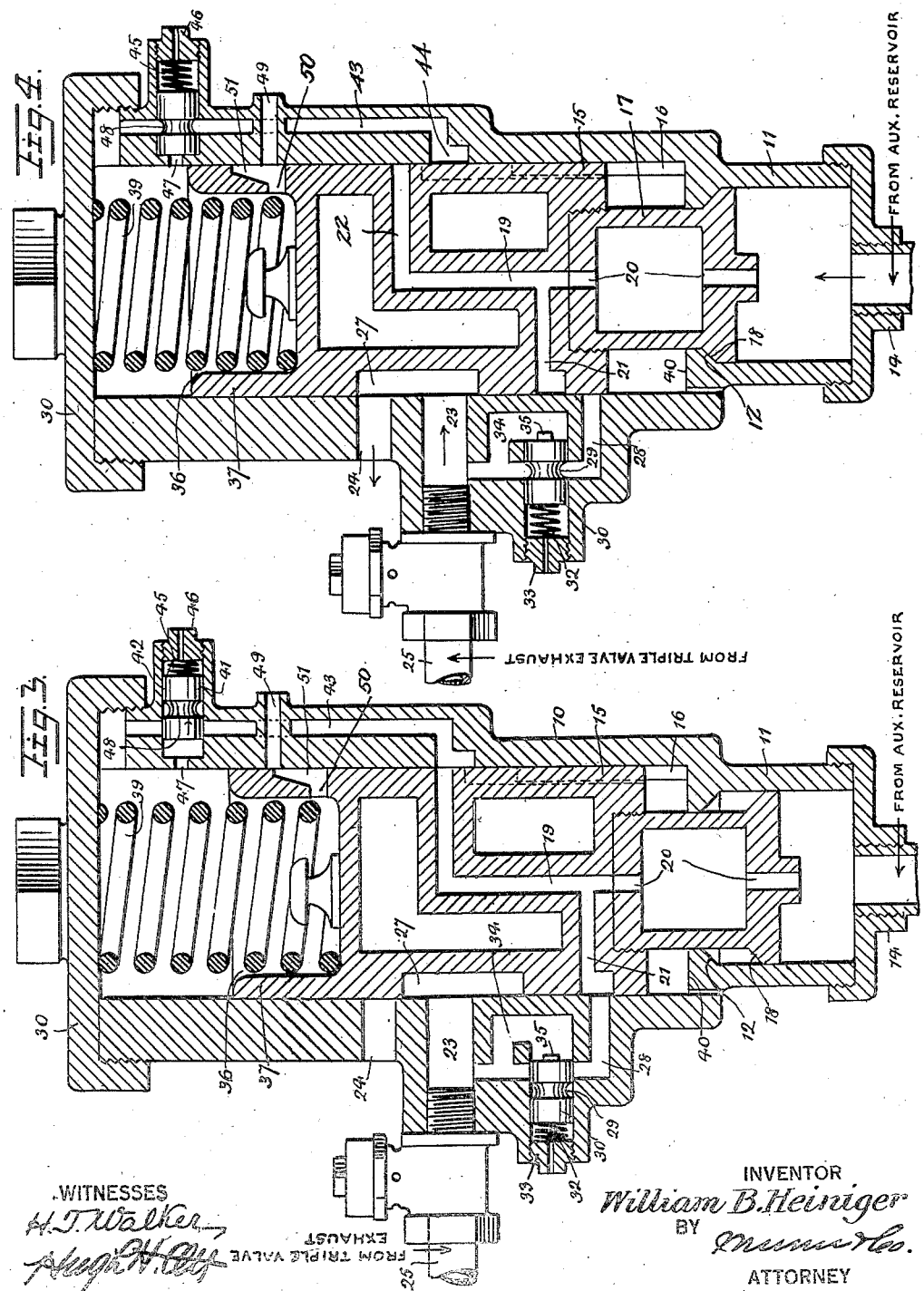

Patented Feb. 7, 1928.

1,658,678

UNITED STATES PATENT OFFICE.

WILLIAM B. HEINIGER, OF JERSEY CITY, NEW JERSEY.

AUTOMATIC PRESSURE RETAINING AND SUSTAINING VALVE FOR AIR-BRAKE SYSTEMS.

Application filed May 3, 1927. Serial No. 188,513.

This invention relates to air brake systems and has particular reference to an improved automatic brake cylinder pressure retaining and sustaining valve.

One of the outstanding objects of the present invention is to provide an improved automatic brake cylinder pressure retaining and sustaining valve for each auxiliary reservoir, which valve is operable by variation in pressure in the auxiliary reservoirs which are charged for the application of the brakes, by the passage of said auxiliary reservoir pressure to the brake cylinders under certain conditions, thereby placing the valve under the control of the engineer, whereby the same serves in the capacity of a safety appliance.

The invention as a further object comprehends as an accessory to an air brake system, an improved automatic retaining and sustaining valve which functions to overcome a predetermined amount of brake cylinder leakage on the cars that have the retaining valves set in working position for a predetermined length of time.

The invention further comprehends an automatic retaining and sustaining valve including a core or piston and an excess pressure valved port in which the amount of pressure required to change the valve from a working position to a release position is governed by the circumstances that the conditions require and is accomplished by the functioning of the excess pressure valved port in conjunction with the auxiliary reservoir pressure and the piston or core.

The invention furthermore comprehends in a retaining and sustaining valve of the character set forth, a blow-down valved port for governing the amount of pressure to be retained in the brake cylinders and the rate of brake cylinder pressure reduction on the cars where the retaining valves are set in a working position.

The invention furthermore comprehends an improved automatic retaining and sustaining valve by virtue of which the number of cars on which the automatic retaining valves are to be placed in working or set position, may be controlled by a careful manipulation of the engineer's brake valve and in which the pressure to open and close the valve, the pressure to be retained in the brake cylinders, the amount of brake cylinder leakage to be overcome, and the excess pressure, may all be predetermined.

As a further feature the invention contemplates in an air brake system, an automatic retaining and sustaining valve by virtue of which the engine man is afforded a range between any predetermined amounts of pressure to operate the brakes in service position without setting the retainers in working position, and in which said valves after having been set in working position, will remain in said position until after the auxiliary reservoirs are charged to the desired pressure, thereby assuring a maximum auxiliary reservoir pressure before the valves are moved to a release position. This feature in conjunction with the sustaining valve feature, allows for faster travel on grades in view of the fact that the engineer has positive knowledge that ample auxiliary reservoir pressure is available at all times for re-application of the brakes.

The invention furthermore comprehends a valve of the character set forth which insures uniformity of brake cylinder pressure independent of piston travel when the retaining valves are set in working position, as, for instance, on grades.

Another object resides in the provision of an improved valve of the character set forth which is adaptable for either freight or passenger train service, but which in the latter instance may require certain changes in the springs and other parts to conform with the higher brake pipe and auxiliary reservoir pressures.

Another important feature of the present invention resides in the provision of a device which prevents nonobservance of the rules as to the having of a required brake pipe pressure before leaving a terminal.

As a further object the invention contemplates a device which facilitates the detection of defective triple valves due to the feed ports being partially clogged or otherwise inefficient.

A still further object resides in the provision of an automatic pressure retaining and sustaining valve which is comparatively simple in its construction and mode of operation, which is economical to produce and install, and which is highly efficient in its purposes to obtain a graduated release, maintenance of brake cylinder pressure, the ability to obtain emergency pressure at any time, and a uniformity of brake cylinder pressure independent of the piston travel.

With the above recited and other objects in view, reference is had to the following description and accompanying drawings in which there is exhibited one example or embodiment of the invention, while the appended claims define the actual scope of the invention.

In the drawings—

Figure 1 is a vertical sectional view through the improved retaining and sustaining valve illustrating the same in inactive or lap position;

Fig. 2 is a similar view illustrating the valve in a position for admitting pressure for increasing the resistance of the valve core or piston;

Fig. 3 is a similar view illustrating the working position;

Fig. 4 is a similar view illustrating the release position.

Referring to the drawings by characters of reference, 10 designates a substantially cylindrical main valve casing, having a lower end 11 of reduced diameter defining at its juncture with the main body portion, an internal conical seat 12. The reduced lower end portion 11 is closed by a closure cap 13, which has a central bossed intake 14 connected and communicating with the auxiliary reservoir of an air brake system. A valve core or piston 15 is mounted within the main body of the valve casing 10 for axial sliding movement, the said core being keyed at 16 against rotation. The valve core or piston 15 is provided with a reduced lower end 17, which is slidable in the reduced lower end 11 of the casing 10, the said reduced lower end 17 of the piston having a conical shoulder 18 adapted upon upward movement of the core or piston to coact and engage with the seat 12 to limit the upward movement of the core in addition to providing a positive seal against the leakage of pressure at this point from the auxiliary reservoir. The valve core or piston is provided with an axial bore 19 extending from its lower end upwardly, which bore at the lower end communicates with an axial bore 20 in the lower reduced end 17 of the core or piston, whereby the pressure from the auxiliary reservoir may flow through the bore 20 into the bore 19. The valve core or piston 15 is provided with a lower radial port 21 and an upper radial port 22, which ports communicate and extend from the axial bore 19 through the periphery of the core or piston 15.

The valve casing 10 is provided with an intake port 23 and an exhaust port 24 disposed in vertically spaced relation, the former communicating with the triple valve exhaust through a conduit or pipe 25, and the latter being in direct communication with the atmosphere. Preferably, a blow-down valve 26 is interposed in the triple valve exhaust conduit or between said conduit and the intake port 23, the purpose of which blow-down valve will be hereinafter set forth.

The valve core or piston 15 is provided with a peripheral recess or passageway 27, which upon movement of the piston upwardly to a predetermined position, establishes communication between the triple valve exhaust intake port 23 and the exhaust port 24. Between its lower end and the intake port 23, the valve casing is provided with a pressure passage 28 which communicates with and leads from the interior of the valve casing 10 and extends through and communicates with the intake port 23. A transverse bore 29 intersects the pressure passage 28, and the transverse bore 29 has mounted therein for axial sliding movement a valve core 30, which will hereinafter be referred to as the "sustaining valve", which sustaining valve is in the nature of a piston having a peripheral groove 31. The piston or sustaining valve element 30 is normally urged in one direction by a coiled expansion spring 32 having the desired tension which for purposes of illustration will be assumed to be twenty-five pounds. The spring is interposed between one end of the sustaining valve and a vented closure plug 33, which is threadedly engaged in the outer end of the transverse bore 29. The opposite end of the transverse bore 29 communicates with a passage 34 which leads into and communicates with the pressure passage at a point between the sustaining valve and the triple valve exhaust pressure intake port 23. This end of the sustaining valve element 30 is provided with an abutment lug 35, which prevents flat engagement of said end with the end wall of the transverse bore 29, and at all times permits pressure from the triple valve exhaust to act upon the inner end of the valve element or piston 30. It is, of course, obvious if no pressure or pressure less than twenty-five pounds exists in the port 23 and in the passage 34, the spring 32 will force the sustaining valve element 30 to the position illustrated in Fig. 2, in which instance the valve element 30 intersects and blocks the pressure feed passage 28 which leads from the interior of the valve casing 10. If the pressure in the port 23 is twenty-five pounds or slightly more than twenty-five pounds, the valve element 30 will assume the position illustrated in Fig. 1, which disposes the peripheral groove 31 in registry with the passage 28.

The upper end of the piston or valve core 15 is provided with an axial recess 36 which defines an annular upstanding collar 37 and the upper end of the valve casing 10 is closed by a closure cap 38, between which and the upper end of the piston or valve core 15, a coiled expansion spring 39 is interposed, the lower end of which is preferably seated in the recess 36 or within the collar 37. The spring 39 is of a predetermined pressure which, by way of example, will be assumed to be thirty pounds when the spring is holding the valve core or piston downwardly to the limit of its movement, where its lower end is in engagement with the shoulder 40 formed at the juncture of the reduced lower end 11 of the casing with the main body portion 10. In this position it should also be noted that the radial passage 21 is below the pressure feed passage 28 and out of communication therewith. The valve casing 10 adjacent its upper end is provided with an excess pressure valve which includes a valve core or plunger 41 mounted in a transverse bore 42 which intersects a vertical by-pass 43 in the valve casing wall 10, the upper end of which by-pass 43 communicates with the interior of the upper end of the valve casing 10 and the lower end of which is formed with a radially inwardly extending port 44 disposed above the upper radial port 22 of the valve core or piston 15 when said piston is in its normal lowermost position. The valve core or plunger 41 of the excess pressure valve is normally forced inward to the limit of its movement, by a coiled expansion spring 45 having a predetermined tension, which for the purpose of illustration, will be assumed to be twenty pounds. The spring 45 is interposed between a vented closure plug 46 threaded in the outer end of the transverse bore 42 and the outer end of the excess pressure valve core or plunger 41. The inner end of the transverse bore 42 is provided with a port 47 communicating with the interior of the upper portion of the valve casing 10. The valve core or plunger 41 is formed with a peripheral groove 48 constituting a passageway which is designed under certain conditions, to register with the by-pass 43 to allow for the free passage of the excess pressure through the by-pass 43 into the interior of the upper portion of the valve casing 10. In the working condition of the valve, however, as illustrated in Fig. 3, where the pressure in the upper portion of the valve casing exceeds twenty pounds, the spring 45 will be compressed so as to move the excess pressure valve core 41 to a position where it will obstruct and close the by-pass 43.

The valve casing 10 is further provided with an excess pressure exhaust port 49 extending radially therethrough and disposed above the upper end of the collar 37 when the valve core 15 is in its normal lowermost position. The collar 37 is provided with a radial port 50, the outer end of which port has an upward extension 51 of gradually decreasing size toward its upper end.

The blow-down valve 26 has a valve element 52 which is normally forced into contact with a valve seat 53 by means of a spring 54, which spring has a predetermined tension,—for the purposes of illustration assumed to be twenty-six pounds. Said valve is further provided with an outlet port 55 of a size which will permit of a blow-down from forty-five pounds to twenty-five pounds in a ten-inch cylinder, seven-inch piston travel, in from forty to sixty seconds, or in an eight-inch cylinder, seven-inch piston travel from thirty to fifty seconds.

In use and operation, when the auxiliary reservoir contains a pressure below thirty-five pounds per square inch, the automatic pressure retaining and sustaining valve will be in the condition and the parts thereof in the position, substantially as illustrated in Fig. 1, or in an inactive or lap position, where the ports 21 and 22 are respectively out of registry with the pressure feed passage 28 and the excess pressure by-pass 43. When the pressure in the auxiliary reservoir exceeds thirty-five pounds and does not exceed forty-five pounds, the valve core or piston 15 will be moved upwardly against the action of the spring 39, to substantially the position illustrated in Figs. 2 and 3, which position disposes the ports 21 and 22 respectively in registry with the feed passage 28 and the port 44 of the by-pass 43.

Fig. 2 illustrates the excess pressure valve open and the sustaining valve closed, while the excess pressure exhaust 49 is also closed. It is thus obvious that some of the pressure will flow through the port 20, the bore 19, the ports 22 and 44, and the by-pass 43, into the upper portion of the valve casing 10, until twenty pounds is received in said upper portion of the casing, which is sufficient to move the excess pressure valve core 41 to a closed position, as illustrated in Fig. 3.

When the pressure in the auxiliary reservoir exceeds forty-five pounds, the piston or valve core 15 is moved upwardly to the position illustrated in Fig. 4, which simultaneously opens the brake cylinder pressure from the triple valve exhaust to the atmosphere by establishing communication between the ports 23 and 24,—and cuts off communication between the ports 21 and 22 and the feed passage 28 and port 44 of the excess pressure by-pass 43. At this stage, it will also be noted that the conical shoulder 18 of the reduced lower end 17 of the piston engages with the conical seat 12 to prevent leakage of the auxiliary reservoir pressure at this point. It will also be noted that in this position, the larger portion of the outer end 51 of the port 50 of the valve core collar 37, is in registry with the excess pressure port 49, thus venting the excess pressure in the upper portion of the valve casing to the atmosphere. The device will remain in this position until the auxiliary pressure drops to or below forty-five points and permits the engineer to make the usual service applications.

When the pressure in the auxiliary reservoir drops to forty-five points, the spring 39 in the upper portion of the valve casing 10 forces the piston or valve core 15 to the position illustrated in Fig. 2, where twenty pounds excess pressure is again admitted to the upper portion of the valve casing 10, through the by-pass 43, while the exhaust 24 remains closed until the auxiliary reservoir again charges to approximately sixty-five pounds. This retains the brake on when applied and permits the auxiliary reservoir to accumulate pressure for re-application of the brakes. Fig. 2 illustrates the position of the valve after the auxiliary reservoir has been fully charged to approximately seventy pounds and the engineer has set the valve in working position by making several applications, thus reducing auxiliary pressure to say forty-five pounds.

What is claimed is:

1. An automatic pressure retaining valve for air brake systems, including a valve casing, and a core therein operable by variations in pressure in the auxiliary reservoir for controlling the opening and closing of the triple valve exhaust by direct action of the auxiliary reservoir pressure upon the opposite ends of the core.

2. An automatic pressure retaining and sustaining valve for air brake systems, including a valve casing, and a core therein operable by variations in pressure in the auxiliary reservoir for controlling the opening and closing of the triple valve exhaust, said valve including means for admitting pressure to the brake cylinder through the triple valve exhaust for sustaining a given pressure in the brake cylinder to compensate for pressure leakage when the brake is set.

3. An automatic pressure retaining and sustaining valve for air brake systems, comprising a casing having spaced intake and exhaust ports, the former connected and communicating with the triple valve exhaust, a valve core mounted in said casing for sliding movement and having a recess adapted upon sliding movement thereof in opposite directions, to respectively establish and cut off communication between said ports, means for normally moving the valve toward one end of the casing to cut off communication between the aforesaid ports, and an inlet at said end of the casing communicating with the auxiliary reservoir whereby a predetermined auxiliary reservoir pressure overcomes the tension of said spring to move the valve core in the opposite direction, to establish communication between said ports for exhausting the pressure from the brake cylinder through the triple valve exhaust.

4. A pressure retaining valve for air brake systems connected with the triple valve exhaust and controlling the opening and closing thereof, said valve including a casing, a valve core, and means for normally moving said core in one direction to close the triple valve exhaust, said casing having an inlet at one end connected with and admitting pressure from the auxiliary reservoir to act upon one end of and to move the core in an opposite direction to open the triple valve exhaust.

5. A pressure retaining valve for air brake systems connected with the triple valve exhaust and controlling the opening and closing thereof, said valve including a casing, a valve core, means for normally moving said core in one direction to close the triple valve exhaust, said casing having an inlet at one end connected with and admitting pressure from the auxiliary reservoir to act upon one end of and to move the core in an opposite direction to open the triple valve exhaust, and means for by-passing excess auxiliary reservoir pressure to act upon the other end and to co-operate with the spring for moving said core in a direction to close the triple valve exhaust.

6. A pressure retaining valve for air brake systems connected with the triple valve exhaust and controlling the opening and closing thereof, said valve including a casing, a valve core, means for normally moving said core in one direction to close the triple valve exhaust, said casing having an inlet at one end connected with and admitting pressure from the auxiliary reservoir to act upon one end of and to move the core in an opposite direction to open the triple valve exhaust, and means adapted upon movement of the core to a predetermined position to by-pass excess auxiliary reservoir pressure to act upon the other end and to co-operate with the spring for moving said core in a direction to close the triple valve exhaust.

7. A pressure retaining and sustaining valve for air brake systems connected with the triple valve exhaust and controlling the opening and closing thereof, said valve including a casing, a valve core, means for normally moving said core in one direction to close the triple valve exhaust, said casing having an inlet at one end connected with and admitting pressure from the auxiliary reservoir to act upon one end of and to move the core in an opposite direction to open the triple valve exhaust, and means operable upon movement of the core to a predetermined position when the brake cylinder pressure drops, for feeding auxiliary reservoir pressure to the brake cylinder through the triple valve exhaust.

8. A pressure retaining and sustaining valve for air brake systems connected with the triple valve exhaust and controlling the opening and closing thereof, said valve including a casing, a valve core, means for normally moving said core in one direction to close the triple valve exhaust, said casing having an inlet at one end connected with and admitting pressure from the auxiliary reservoir to act upon one end of and to move the core in an opposite direction to open the triple valve exhaust, and means operable upon movement of the core to a predetermined position when the brake cylinder pressure drops, for feeding auxiliary reservoir pressure to the brake cylinder through the triple valve exhaust, said latter means including a feed passage in the valve casing extending from the interior of the casing to the triple valve exhaust inlet, a port in the valve core, and a brake cylinder pressure actuated valve element in the feed passage.

9. A pressure retaining valve for air brake systems connected with the triple valve exhaust and controlling the opening and closing thereof, said valve including a casing, a valve core, means for normally moving said core in one direction to close the triple valve exhaust, said casing having an inlet at one end connected with and admitting pressure from the auxiliary reservoir to act upon one end of and to move the core in an opposite direction to open the triple valve exhaust, means adapted upon movement of the core to a predetermined position to by-pass excess auxiliary reservoir pressure to act upon the other end and to co-operate with the spring for moving said core in a direction to close the triple valve exhaust, an excess pressure exhaust port in the valve casing, and a controlling port in the valve core adapted upon movement of the core to a predetermined position for registry therewith.

10. A pressure retaining valve for air brake systems, comprising a casing, a slide valve core in said casing adapted upon movement in opposite directions to respectively open and close the triple valve exhaust, a spring for normally moving the valve in a direction to close the triple valve exhaust, said casing having an inlet communicating with the auxiliary reservoir whereby a predetermined auxiliary reservoir pressure acts upon one end of and moves the slide valve in the opposite direction to open the triple valve exhaust to the atmosphere, and means for by-passing excess auxiliary reservoir pressure to act upon the opposite end of the slide valve in conjunction with the spring, to vary the resistance of the movement of the slide valve to open the triple valve exhaust.

11. A pressure retaining valve for air brake systems, comprising a casing, a slide valve core in said casing adapted upon movement in opposite directions to respectively open and close the triple valve exhaust, a spring for normally moving the valve in a direction to close the triple valve exhaust, said casing having an inlet communicating with the auxiliary reservoir whereby a predetermined auxiliary reservoir pressure acts upon one end of and moves the slide valve in the opposite direction to open the triple valve exhaust to the atmosphere, and means for by-passing excess auxiliary reservoir pressure to act upon the opposite end of the slide valve in conjunction with the spring, to vary the resistance of the movement of the slide valve to open the triple valve exhaust, said means comprising a by-pass in the valve casing, a port in the slide valve for conveying pressure therethrough to the by-pass upon movement of the core to a predetermined position, and a pressure actuated valve element in the by-pass for closing the by-pass by the reception of a predetermined pressure to act upon the opposite end of the slide valve.

12. A pressure retaining valve for air brake systems, comprising a casing, a slide valve core in said casing adapted upon movement in opposite directions to respectively open and close the triple valve exhaust, a spring for normally moving the valve in a direction to close the triple valve exhaust, said casing having an inlet communicating with the auxiliary reservoir whereby a predetermined auxiliary reservoir pressure acts upon one end of and moves the slide valve in the opposite direction to open the triple valve exhaust to the atmosphere, means for by-passing excess auxiliary reservoir pressure to act upon the opposite end of the slide valve in conjunction with the spring, to vary the resistance of the movement of the slide valve to open the triple valve exhaust, said means comprising a by-pass in the valve casing, a port in the slide valve for conveying pressure therethrough to the by-pass upon movement of the core to a predetermined position, a pressure actuated valve element in the by-pass for closing the by-pass by the reception of a predetermined pressure to act upon the opposite end of the slide valve, and a slide valve actuated excess pressure exhaust.

WILLIAM B. HEINIGER.

DISCLAIMER 1,658,678.—*William B. Heiniger*, Jersey City, N. J. AUTOMATIC PRESSURE RETAINING AND SUSTAINING VALVE FOR AIR-BRAKE SYSTEMS. Patent dated February 7, 1928. Disclaimer filed July 19, 1939, by the assignee, *Richard Irvin & Company Incorporated*, and the inventor.

Hereby enter this disclaimer to claims 1 and 4.

[*Official Gazette August 8, 1939.*]